United States Patent [19]

Kramer

[11] 4,165,161

[45] Aug. 21, 1979

[54] MULTIPLE OPTICS SLIDE PROJECTOR

[76] Inventor: Gideon A. Kramer, 2401 SW. 172nd, Seattle, Wash. 98166

[21] Appl. No.: 899,082

[22] Filed: Apr. 24, 1978

[51] Int. Cl.² .................. G03B 21/20; G03B 21/26; G03B 1/48
[52] U.S. Cl. .................................... 353/86; 353/94; 353/95; 353/111
[58] Field of Search .................. 353/82, 83, 86, 90, 353/92, 93, 94, 111, 95, 96

[56] References Cited

U.S. PATENT DOCUMENTS

| | | | |
|---|---|---|---|
| 3,161,109 | 12/1964 | Carrillo | 353/86 |
| 3,174,395 | 3/1965 | Krull | 353/118 |
| 3,296,727 | 1/1967 | Liguori | 353/25 |
| 3,369,452 | 2/1968 | Grenier | 353/90 |
| 3,468,603 | 9/1969 | Kovarik et al. | 353/90 |
| 3,501,231 | 3/1970 | Fisher | 353/82 |
| 3,501,232 | 3/1970 | Jackson | 353/82 |
| 3,813,797 | 6/1974 | Masters et al. | 40/36 |
| 3,884,569 | 5/1975 | Hickey | 353/111 |
| 4,094,599 | 6/1978 | Frey | 353/96 |

*Primary Examiner*—Steven L. Stephan
*Attorney, Agent, or Firm*—Cole, Jensen & Puntigam

[57] ABSTRACT

The projector includes two projection optics systems and two slide gates which move slides acquired from a slide receptacle into and out of a viewing position in all of the projection optics systems. The slide gates are movable between a first position, which is common to both slide gates and in which slides are moved between the slide receptacle and the side gate means, and the second position in one of the projection optics systems. The slides move by gravity from the slide receptacle into the slide gates and by means of a slide lifter from the slide gates back into the slide receptacle. A combination of a scalloped gear matching the depending lugs on the slide receptacle and a stepping motor to control the movement of the gear provides efficient and economical control over the movement of the slide receptacle. The slide gates, the slide lifter, and the slide receptacle gearing are independent of each other in operation, so that they may be activated in any sequence.

27 Claims, 13 Drawing Figures

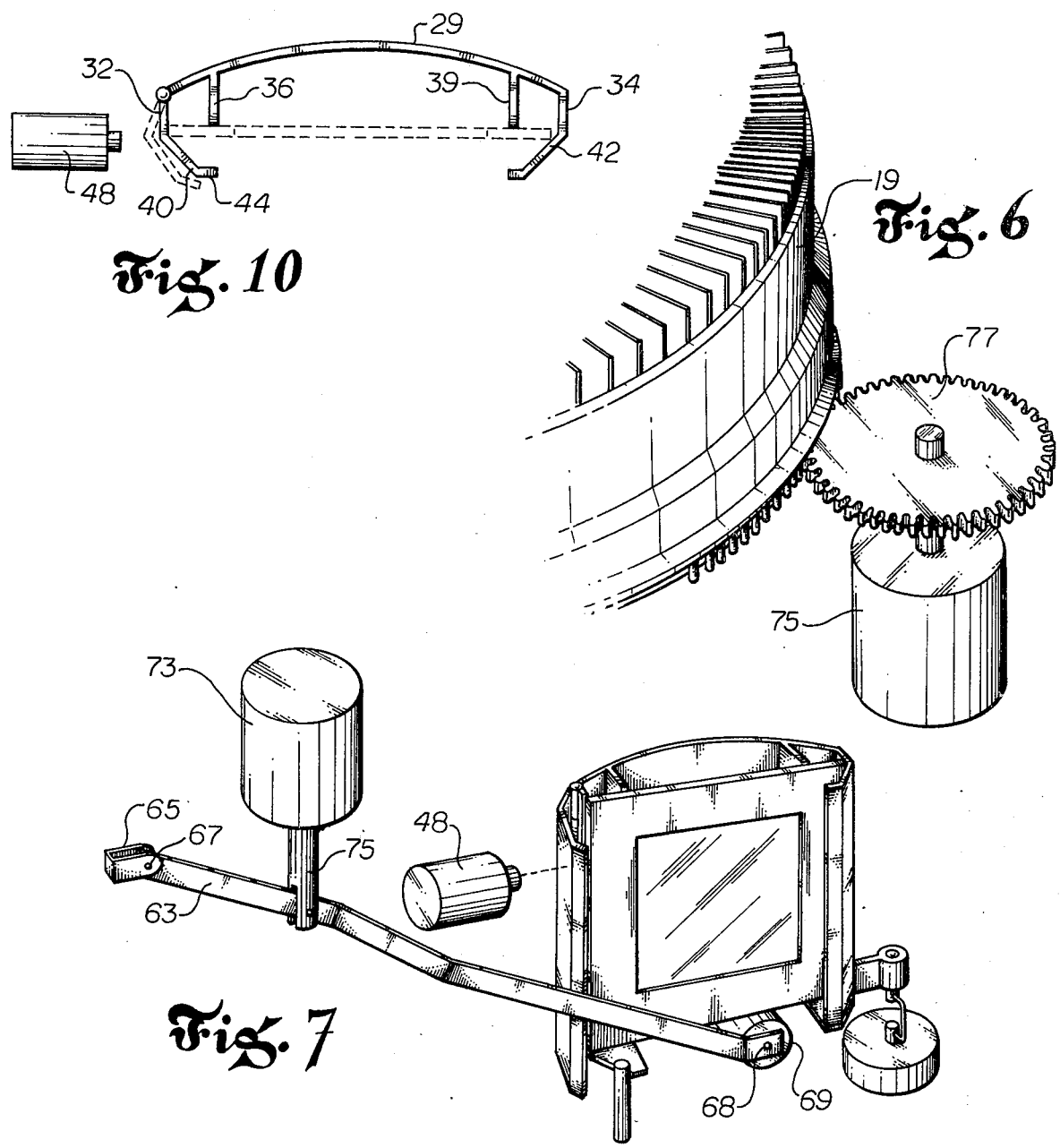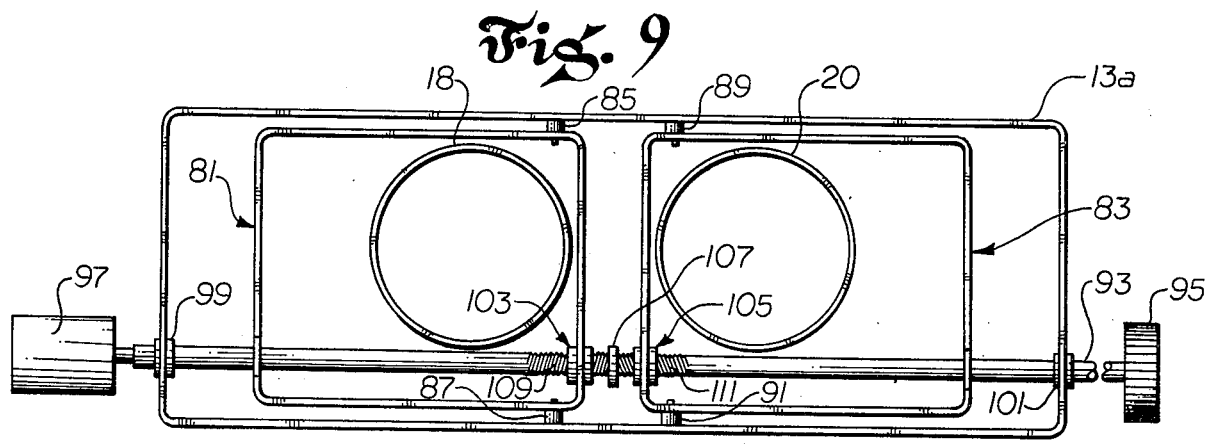

MULTIPLE OPTICS SLIDE PROJECTOR

BACKGROUND OF THE INVENTION

The present invention relates generally to the slide projector art, and more particularly concerns lap-dissolve slide projectors.

Most conventional slide projectors use a single projection optics system, so that in operation of the projector, an individual slide is successively acquired from a slide receptacle, moved into the projection optics system, where it is projected on a screen, and then returned to the slide receptacle. With single projection optics projectors, there is a time lapse between the projection of successive slides, to permit the slide just projected to be returned to the slide receptacle, before the following slide is acquired from the slide receptacle and positioned in the projection optics system. This time lapse, when the screen is blank, can be quite long, and is disruptive of the slide presentation.

A significant amount of effort has been expended in order to correct this disadvantage of conventional slide projectors. So-called lap-dissolve slide projectors have been developed specifically to eliminate the blank screen between successive slides. Typically, a lap-dissolve slide projector includes two projection optics systems which are synchronized with one or two slide receptacles. In operation, the next slide to be projected is moved into one projection optics system while the previous slide is being projected by the other optics system. Thus, when the slide being projected is to be returned to the slide receptacle, the next slide is ready to be projected, and the first slide can be dissolved into the next, by use of known shutter or mirror techniques. This results in a continuous sequence of images on the screen, eliminating the blank screen.

Such a result, however, has previously required a sophisticated mechanism for moving the slides between the slide receptacle(s) and the projection optics systems, as well as complex control mechanisms to properly sequence the various mechanical and electrical subsystems to accomplish the lap-dissolve technique.

A number of technical approaches has been used in this area. One approach uses multiple or single linear slide receptacles with two projection optics systems, in a single projector. Examples of such approaches are shown in U.S. Pat. Nos. 3,468,603 and 3,501,232. The mechanical systems which have been developed to implement these approaches have, however, proved to be too complex to be reliable or commercially practical. Further, they both require linear slide trays, which are no longer widely used.

There are relatively few lap-dissolve single projectors capable of operating with circular slide trays, even though such trays are now common in the industry. One lap-dissolve slide projector known to applicant using a circular slide tray is the subject of U.S. Pat. No. 3,689,140. The circular slide receptacle in that projector is shifted laterally to serve two projection optics systems. The mechanical structure to implement such an arrangement, however, is very complicated and hence, commercially impractical.

Another common approach uses two projectors. When two projectors are used, however, successive slides must be alternately taken from the slide receptacles of each projector, thus requiring two slide receptacles for each presentation, with the slides stored in an alternating sequence between them. This has proven to be an inconvenient storage arrangement. Additionally, the control and synchronization required to make two projectors operate as a single lap-dissolve unit results in a cumbersome combination which is often very complicated for the user to successfully operate.

In view of the above, it is a general object of the present invention to provde a multiple projection optics slide projector which overcomes one or more of the disadvantages of the prior art noted above.

It is another object of the present invention to provide such a slide projector which combines multiple projection optics systems and a single slide receptacle to accomplish a continuous slide presentation in a single projector.

It is a further object of the present invention to provide such a projector which is capable of using a circular slide receptacle.

It is an additional object of the present invention to provide such a slide projector in which one or more of the operating subsystems of the slide projector is capable of operating independently of other subsystems.

It is yet another object of the present invention to provide such a slide projector in which slides are returned to the slide receptacle in the same order as they are removed therefrom.

SUMMARY OF THE INVENTION

Accordingly, the present invention is an apparatus for moving slides stored in a slide receptacle into and out of either of at least two projection optics systems, for use in a multiple projection optics slide projector. The apparatus includes first and second slide gate means for holding slides. Each slide gate means is movable between a first position and a second position which are no higher than the slide receptacle. In the first position, slides are acquired and released by the slide gate means, and in the second position, which is in one of the projection optics systems, acquired slides are projected onto a screen or the like for viewing.

The present invention may also include a complete multiple optics slide projector, which is adapted to receive a slide receptacle having a plurality of individual compartments in which slides may be positioned. The projector includes means for supporting the slide receptacle, and first and second projection optics systems for projecting slides onto a screen or the like for viewing. Also included are the first and second slide gate means specified in the paragraph above. Further, the projector includes means for moving a slide from the slide gate means to the slide receptacle when the slide gate means is in its first position, and means for moving the slide receptacle in such a manner that each compartment in the receptacle is uniquely addressed. Furthermore, the first and second slide gate means, the slide moving means and the slide receptacle moving means are so constructed that they operate independently, so that they may be actuated independently in any specified sequence.

DESCRIPTION OF THE DRAWINGS

A more thorough understanding of the invention may be obtained by a study of the following detailed description taken in conjunction with the accompanying drawings in which:

FIG. 6 is a detailed isometric view of the means for moving the circular side tray used with the projector of FIG. 1.

FIG. 7 is an isometric view of the slide lifter and one slide gate of the projector of FIG. 1.

FIG. 9 is a cross-sectional view of the slide projector of FIG. 1 taken along lines 9—9 of FIG. 2.

FIG. 10 is a top plan view of the slide gate structure of the present invention.

DESCRIPTION OF PREFERRED EMBODIMENT

Figure 1:
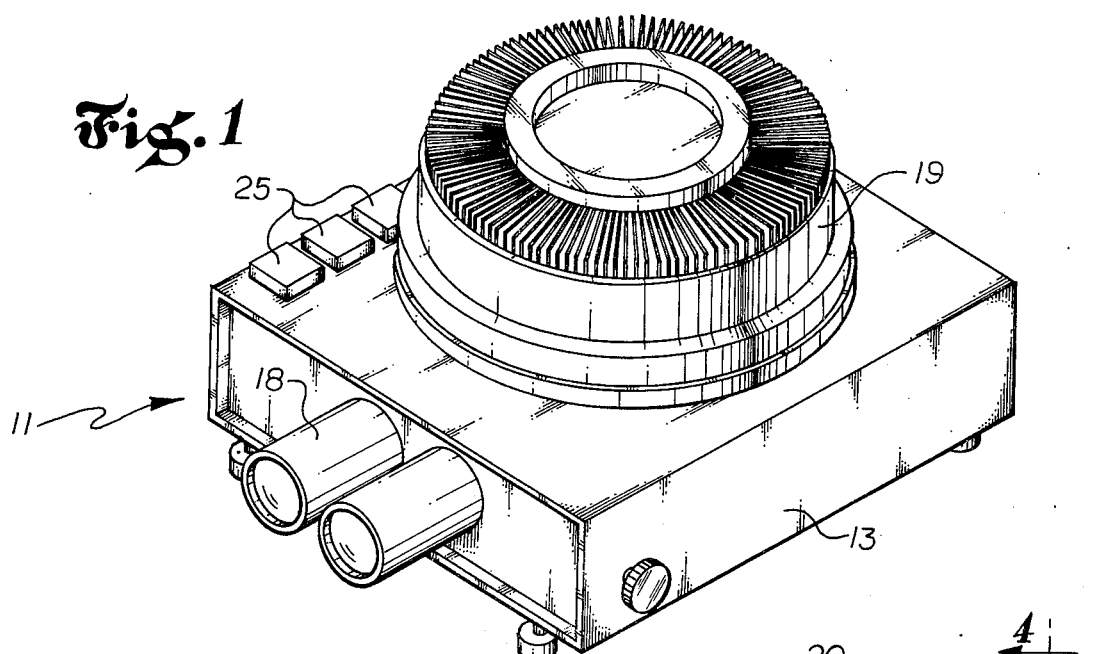
FIG. 1 is an isometric view of the slide projector of the present invention.
Figure 2:
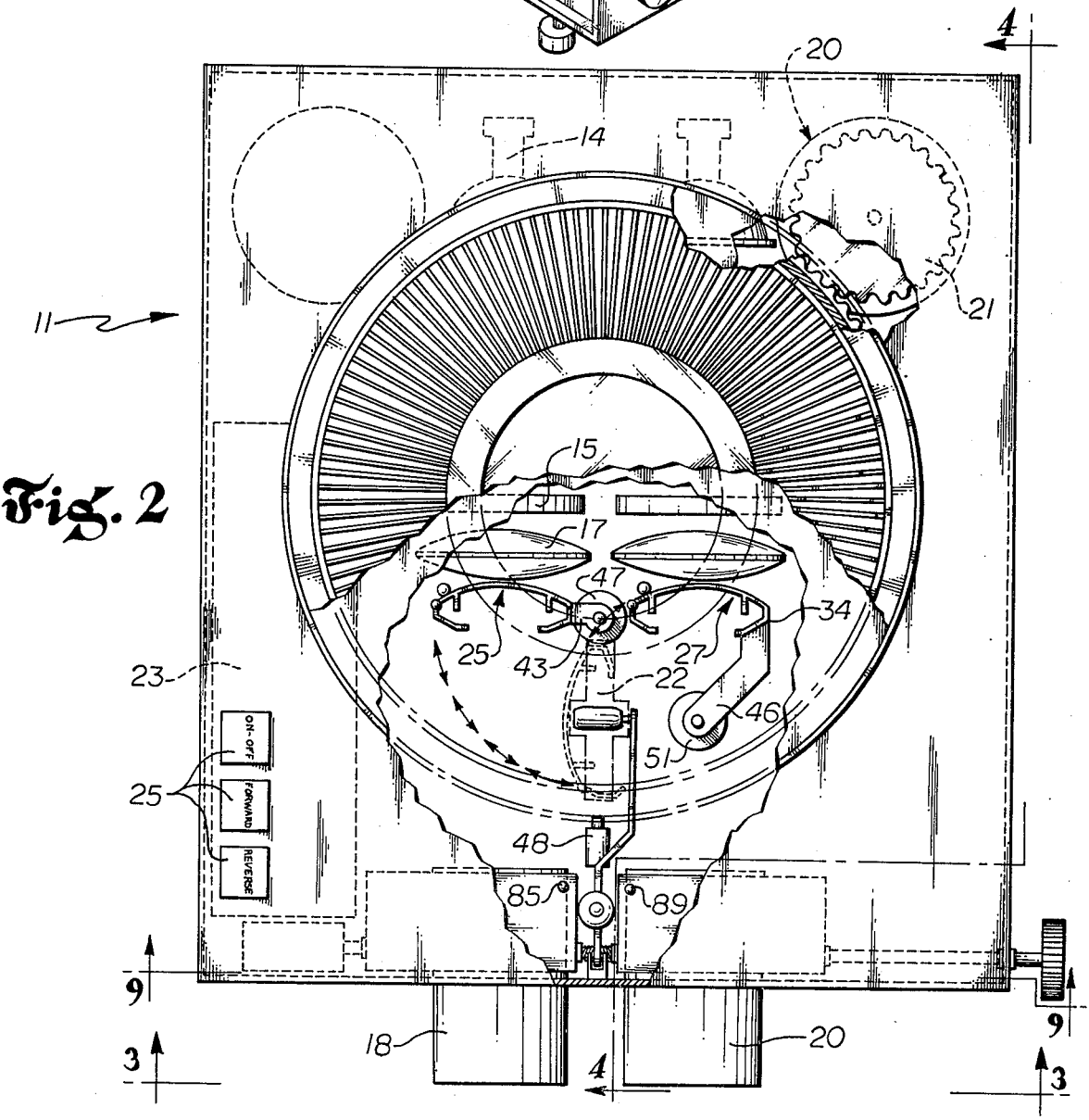
FIG. 2 is a top plan view, partially cutaway, of the slide projector of FIG. 1.
Figure 3:
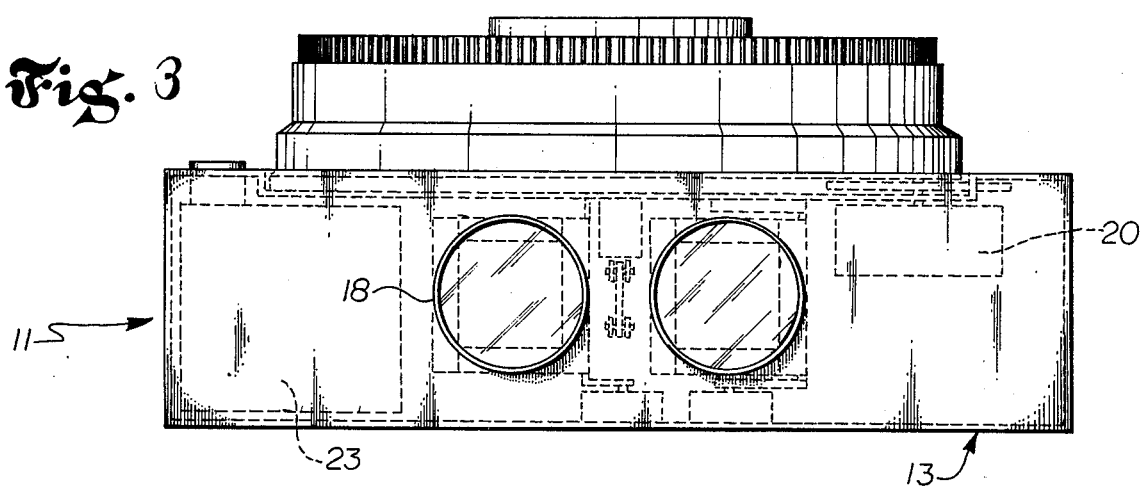
FIG. 3 is a front elevational view of the slide projector of FIG. 1.

Referring to FIGS. 1, 2 and 3, the slide projector of the present invention is shown both in its general configuration and in some detail with respect to its novel structural aspects. The slide projector shown generally at 11 includes a cabinet 13, which houses two identical projection optics systems. Each projection optics system comprises a light source 14, heat filter 15, condenser lens 17, and a projection lens 18.

A circular slide receptacle 19, which may be, for instance, similar to one manufactured and sold under the trademark Carousel by Eastman Kodak Co., carries the slides on the projector, while a stepping motor 20 and related gear 21 move the receptacle 19. The receptacle 19 includes an opening 22 in its stationary lower surface which mates with a similar opening in the projector's supporting surface, so that as the slide receptacle 19 is revolved, the slides, one by one, fall through opening 22 into one of two slide gates, which move the slides into one of the projection optics systems, as explained in more detail below.

A control module 23 controls the operation of the various systems in the slide projector in response to commands provided by the operator through control switches 25.

FIGS. 2, 3, 5, 8, and 10 show in varying detail one embodiment of the slide gate structure, i.e. slide gates 25 and 27, of the present invention. Each slide gate moves slides between a first position, which is physically common to both slide gates, for communication with the slide receptacle, and a second position, in which the slide in the slide gate is positioned in one of the projection optics system for projection on a screen or the like.

Figure 5:
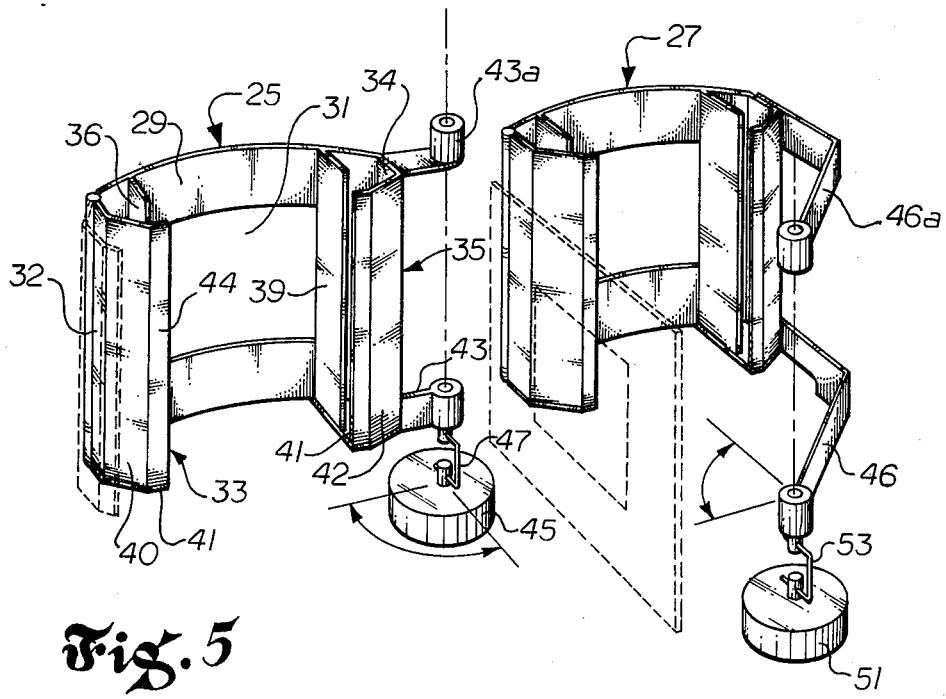
FIG. 5 is an isometric view showing in detail the slide gate structure of the present invention.

Referring specifically to FIG. 5, each slide gate is a frame-like structure for holding a slide. It includes a rim 29, which is almost square and which has a rectangular opening 31 of about the same configuration and size as the portion of a slide which is projected. In its operative position, rim 29 is upstanding and is slightly concave from side to side. Along the vertical side edges of rim 29 are two hollow, box-like projections 33 and 35, which extend forwardly of rim 29. Each box-like projection is open at its top, but is closed off at its bottom by bottom plate 41, against which the slide rests when it is on the slide gate.

Box-like projection 33 includes flat plates 32 and 36, which extend from top to bottom of rim 29 and directly forwardly thereof. Box-like projection 35 further includes flat plates 34 and 38, which extend from top to bottom of rim 29 and directly forwardly thereof. Plates 32 and 34 extend from each lateral edge of rim 29, while plates 36 and 38, respectively, are spaced approximately ¼ inch inward of projections 32 and 34. Extending from the other vertical edge of projections 32 and 34 are two flat plates 40 and 42, which are approximately 5/16ths inches wide and are angled inward at about 45°. A narrow lip 44 extends from the forward vertical edge of plate 40, angled inwardly at about 45°, so that it is perpendicular to plate 32.

In the embodiment shown, the combination of plate 32, plate 40 and lip 44 is rotatably connected to rim 29 at edge 37. This permits the combination to swing between an open position shown in dotted lines in FIGS. 5 and 10 and a closed position shown in solid lines. In the embodiment shown, the arc of travel is approximately 15° between the open and closed positions. Bottom plate 41 is secured to the rim 29 and the other plate (i.e. plate 36), and hence does not move.

When the combination of plates 32 and 40 and lip 44 is in its open position, a slide may be inserted into the slide gate. The combination is swung open against a spring bias (not shown) under the influence of magnet 48. The slide will then drop down adjacent the free ends of projections 36 and 38, and between projections 40 and 42. The magnet 48 is then de-activated, and the combination of projections 32 and 40 and lip 44 will swing back to its biased position, forcing the slide firmly against projections 36, 38, 40 and 42, as shown in FIG. 10.

Each slide gate, i.e. gates 25, 27, is rotatable about individual vertical axes which are spaced apart from each other, so that they can be moved between a common position, where slides are moved between the slide receptacle and the slide gates, and a viewing position in a projection optics system. The common position for the two gates is shown in dotted lines in FIG. 2, while the viewing position is shown in solid lines.

Referring to FIGS. 5 and 8, the pivot point or axis for slide gate 25 is located just to the rear of, but in substantially the same vertical plane as, the common position of the two slide gates. The pivot structure includes a small projection 43 which extends off plate 34 near the bottom thereof, and is secured to a rotating solenoid 45 by a rigid wire connection 47. Another projection 43 extends off plate 34 near the top thereof and is rotatably secured to an upper pivot point (not shown). In operation, slide gate 25 pivots substantially 90° between its viewing position and its common position.

Slide gate 27 is rotatable about a vertical pivot axis which is located at the conjunction of lines drawn through the midpoints of the slide gate 27 in its viewing and common positions. The pivot structure includes elongated angled projections 46 and 46a which extend, respectively, from the bottom and top of the slide gate along one edge thereof. The top projection 46a is rotatably secured to an upper pivot point (not shown), while the lower projection 46 is secured to rotating solenoid 51 by a stiff connecting wire 53. In operation, slide gate 27 moves approximately 90° between its viewing position and its common position.

Figure 8A:
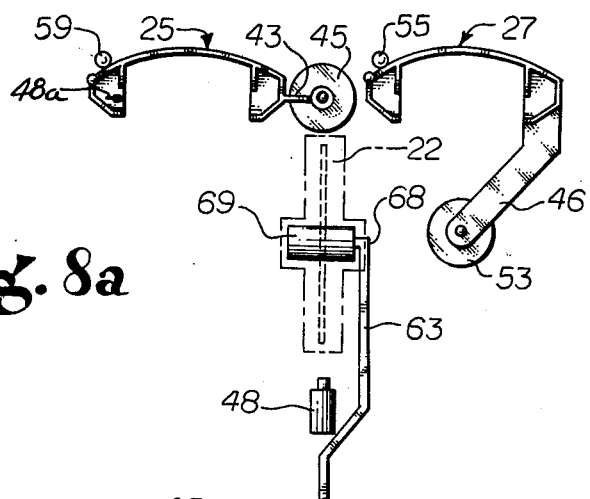
FIGS. 8a through 8c are top plan views of the slide gate structure of FIG. 5, showing the movement of the slide gate structures between their two operating positions.
Figure 8B:
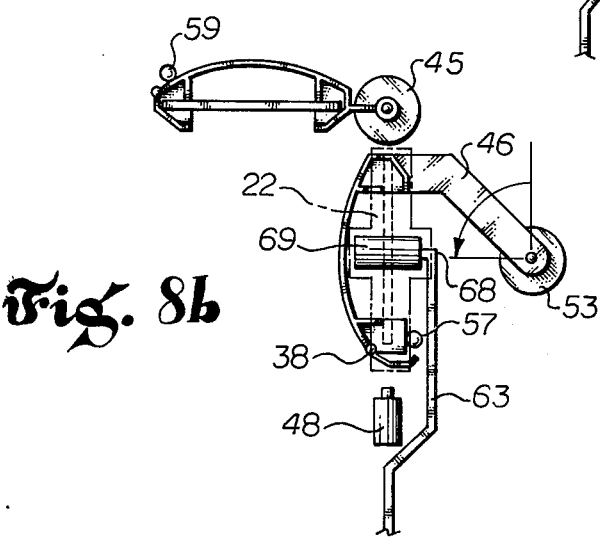
Figure 8C:
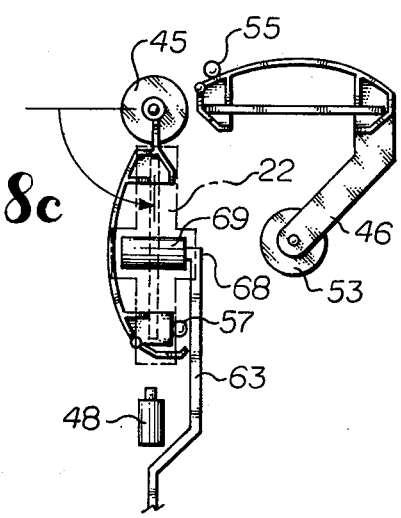

FIGS. 8a through 8c show the combined various operating positions of slide gates 25 and 27. Each gate 25, 27 is movable between a viewing position and a common position.

FIG. 8a shows both slide gates 25, 27 in their viewing position, in which the slides are projected on a screen through the respective projection lenses. FIG. 8b shows slide gate 27 in the common position, ready to receive a slide from the slide receptacle or ready to give its slide up to the slide receptacle by means of a slide lifter, which will be explained in following paragraphs. The slide gate structure 27 moves through substantially 90° of arc between its common position, shown in FIG. 8b, and its viewing position, shown in FIG. 8a.

A stop 55 is provided to accurately position slide gate 27 in its viewing position while a stop 57 accurately positions slide gate 27 in its common position. Slide gate 27 is rotated between positions by rotating solenoid 53 acting under the control of electrical signals from control module 23.

Slide gate 25 also moves between a viewing position, shown in FIG. 8a, and a common position, shown in FIG. 8c. Slide gate 25 moves through approximately 90° of arc, and in the viewing position is located against stop 59, while in the common position is located against stop 57.

When either slide gate 25 or 27 is in the common position, and the slide lifter is in its lowermost position, the rotatable combination in one box-like projection is opened by activation of magnet 48. When the rotatable combination is swung open, a slide may be loaded into the slide gate. After a slide has been loaded into the slide gate, magnet 48 is deactivated, thereby permitting the rotating combination to close, so that the slide is held in place in the slide gate. The rotating portions of each projection are spring-biased, so that they are swung open against the force of the spring by magnet 48. When magnet 48 is deactivated, the spring (48a FIG. 8a) biases the rotating combination back into its closed position.

Figure 4:
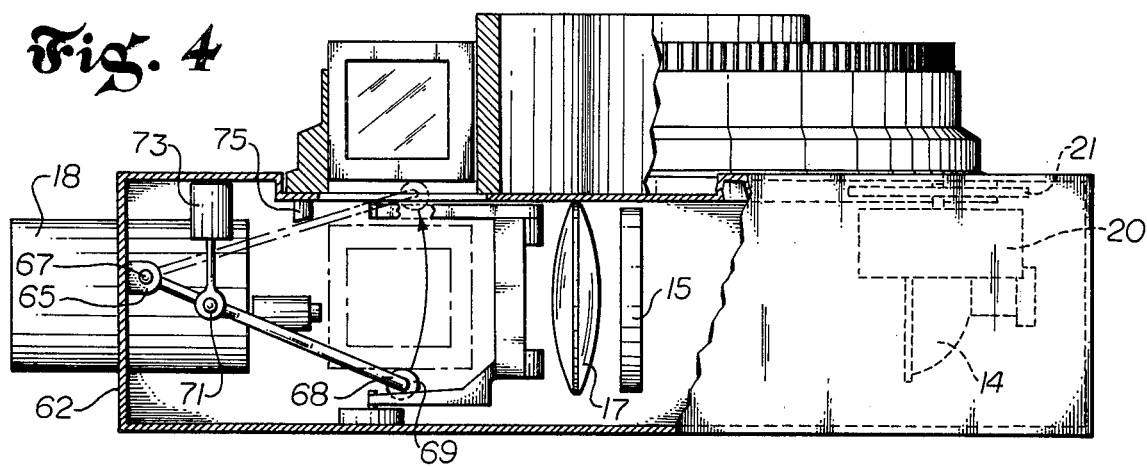
FIG. 4 is a side elevational view, partially cutaway, of the slide projector of FIG. 1.

FIGS. 4 and 7 show in detail the slide lifter used in the projector of the present invention, although FIGS. 2 and 8 also show certain aspects of the lifter. The slide lifter is used to move slides from a slide gate in its common position back into the slide receptacle. The slide lifter includes an elongated rod-like element or arm 63 which is pivoted about one end 67 at pivot 65, while at the other end 68 is positioned a plate or roller element 69 which extends horizontally from element 63. Pivot 65 is located on the front wall 62 of the projector cabinet, at substantially a midpoint between the two projections lenses 18 and 20, and slightly more than midway vertically of the wall 62.

Attached to arm 63 a small distance from the pivot 65 is a vertical arm 71 of a linear solenoid 73. The section of arm 63 between pivot 65 and the connection point with arm 71 is substantially straight and is in approximately the same vertical plane as a slide in the common position, as shown most clearly in FIGS. 2 and 8. Just beyond the connection point with arm 71, arm 63 is offset to the right so as to clear magnet 48 and opening 22. Arm 63 straightens out to be parallel with the first section of arm 63 after the required clearance has been obtained, and extends to just about the midpoint of opening 22 and just to the right side thereof.

Extending from arm 63 to the left toward opening 22 is the horizontal plate or roller element 69. Although element 69 is shown to be cylindrical, it may also take other configurations, such as a plate. Element 69 extends perpendicularly to the slides that it contacts. From one end to the other, element 69 is curved in a shallow convex configuration, so that it extends further upward at the center than at its edges, in order that the edges of element 69 do not catch the slides in the receptacle as they move over the element when the receptacle is moved.

The opening 22 in the bottom of receptacle 19 and the opening in the support surface for the receptacle are enlarged at their midpoints, as shown most clearly in FIGS. 2 and 8, to accommodate the configuration of element 69, so that it can extend up higher than the plane of the opening in the slide receptacle when the lifter is in its uppermost position.

In operation, the slide lifter moves between two positions under the control of solenoid 73. The lifter lifts slides from the slide gates when they are in the common position back into the slide receptacle 19. When a slide is ready to be moved back up into receptacle 19, the lifter is in its lowermost position, beneath the slide, as shown most clearly in FIGS. 4 and 7. Solenoid 73 is activated, so that arm 63 pivots about pivot 65, resulting in element 69 exerting an upward pressure on the slide, forcing the slide upwardly. Arm 63 continues to move about pivot 65 until element 69 reaches its uppermost position, when arm 63 comes against stop 75 (FIG. 4).

At this point, magnet 48 is energized, opening the slide gate, so that when the next slide is ready to drop out of the receptacle, the slide gate is ready to receive it.

In this position, the top surface of element 69 extends above the surface of the slide receptacle 19 in which opening 22 is located. The edges of element 69 extend just above the slide receptacle surface, while the midpoint of the element extends approximately ⅛ inch above the receptacle surface. The slide has now cleared the surface of the slide receptacle 19, and the slide receptacle 19 is rotated, so that the returned slide clears the opening 22. The next slide moves up and over the surface of element 69 from one edge thereof to approximately its midpoint.

The configuration of element 69 from end to end is thus fairly important in order to permit movement of the slide receptacle 19 without the slides binding on element 69. It has been found for a plate or roller element approximately ¾ inch long, that the ends of the element should just about mate with the surface of the receptacle, while the midpoint of the element should be about ⅛ inch above the receptacle surface.

When the receptacle rotates with the lifter in its uppermost position, the slide just returned by the action of the lifter moves away from the opening and the next slide is moved over opening 22 but is prevented from dropping through by the presence of element 69. When receptacle 19 has completed its rotational move, the solenoid 73 is deactivated, and arm 63 then returns to its lowermost position. Simultaneously, the next slide moves under the influence of gravity along with the element 69 as it drops. When element 69 is in its lowermost position, the slide is in the slide gate, and the slide gate may now be moved into its viewing position.

The movement of slide receptacle 19 is controlled by the combination of a stepping motor 20 and a gear 21. The individual teeth of gear 21 are configured to mesh with mating lugs on slide receptacle 19, which results in a movement of the slide compartment portion of the slide receptacle. In a typical configuration, the slide receptacle 19 will have 81 teeth and gear 21 will have 24 teeth. The stepping motor 20 is adapted to provide the correct amount of rotational movement, i.e. 15°, for the gear 21 to move the compartment portion of the slide receptacle a specified amount, i.e. one compartment.

In order to provide a sequential showing of slides in the projector of the present invention, wherein the slides are returned to the slide receptacle in the same order as they are removed, a particular sequence of both forward and reverse movement of the receptacle is required. The combination of a stepping motor and a gear which mates with the lugs on the slide receptacle provides a simple and practical means to accomplish such a result.

Figure 11:
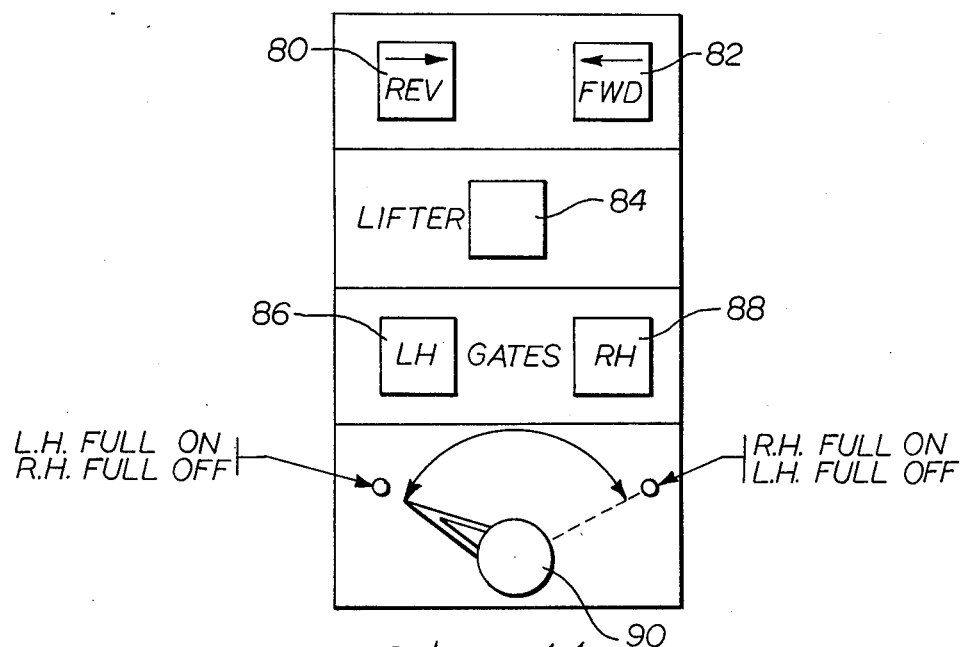
FIG. 11 is a schematic diagram showing a manual control panel for the slide projector of the present invention.

Referring now to FIG. 11, a control panel for manually operating the projector of the present invention is shown. As indicated above, the movement of the tray, each slide gate, and the lifter are independently activated through solenoids and stepping motors. Forward and reverse movement of the receptacle is controlled through buttons 80 and 82, while the lifter is controlled by button 84, and the slide gates by buttons 86 and 88. A manual control 90 for a conventional lap-dissolve system is also shown.

With such an arrangement, the operator may control the projector in various sequences. Hence, the receptacle may be moved any number of slides in either direction; each gate may be operated in any sequence, and the lifter activated when necessary. This independent electrical control over the major systems of the projector eliminates complicated mechanical cam follower systems so prevalent in the prior art, and permits the operator to have precise control over the operation of the projector.

Since the elements specified above are independently actuated by an electrical signal, it is contemplated that routines or programs of signals can be produced which will operate the projector automatically. One simple program would involve the sequential activation of both slide gates, with the slides being returned to the receptacle in the same order as they were taken. The lap-dissolve system would be activated at a selected rate to blend each new slide to be shown into the previous one. Such routines are known in the art and their preparation would be conventional. Such routines, per se, form no part of the present invention.

Referring now to FIG. 9, a relatively simple but novel means for effecting lateral movement of the optical system to accomplish either image separation, or to correct parallax, is shown. The lenses 18 and 20 are each supported in lens frames 81 and 83, which are substantially square in cross-section, about 2 inches long, and are open at both ends to permit lenses 18 and 20 to extend therethrough.

Lens frames 81 and 83 are pivotally supported within an interior frame 13a by vertical support rods 85 and 87 for frame 81, which are located between frame 81 and the upper and lower walls of interior frame 13a at the right rear corner of frame 81 (FIGS. 2 and 9), and by vertical support rods 89 and 91 for frame 83, located between frame 83 and the upper and lower walls of interior frame 13a at the left rear corner of frame 83. This arrangement permits lens frames 81 and 83 to rotate horizontally toward and away from each other.

The apparatus for effecting the rotational movement is also shown in FIG. 9. It includes an elongated rod 93, which extends horizontally through interior frame 13a and both lens frames 81 and 83. One end of rod 93 extends through cabinet 13 of the projector and terminates in a turn knob 95. The other end terminates between interior frame 13a and cabinet 13 and a motor 97 is secured thereto.

Rod 93 extends through frames 81 and 83 near the bottoms thereof and close to the front ends thereof. Bushings 99 and 101 are provided to support rod 93 through the side walls of interior frame 13a. Clearance openings are provided in the outer sidewalls of lens frames 81 and 83, while in the inner sidewalls are positioned oppositely threaded floating nuts 103 and 105.

A stop 107 is provided on rod 93 at the midpoint between frames 81 and 83. From the midpoint of rod 93 toward both ends thereof, for approximately 1-2 inches, rod 93 is threaded in opposite directions. These two oppositely threaded portions 109 and 111 mate with threaded nuts 103, 105 so that as the rod is rotated in one direction, the two frames move forward each other, while when the rod is moved in the other direction, the two frames move away from each other. Movement may be effected either manually, through the knob, or automatically, by the motor.

Conventional apparatus (not shown) may also be provided to move each lens 18 and 20 back and forth to accomplish focusing. For instance, vertical rods may be provided having threaded sections (vertical) which mate with corresponding portions on the lenses. Rotation of the rod will thus result in to and fro movement of the lens.

Hence, a practical lap-dissolve slide projector using a single circular tray has been disclosed. Important structural aspects of the slide projector include two slide gate structures which operate to precisely locate slides in a novel manner. In operation, the slide gates are rotated about spaced pivot points between a common position, where slides are removed from, and returned to, a slide receptacle, and a viewing position, in which the slides are projected onto a screen. Also disclosed is a slide lifter which moves the slides from the common position back into the receptacle, as well as novel receptacle gearing and image separation/parallax correction structures. The slide gates, the slide lifter, and the receptacle gearing are adapted so that each may be operated independently, and hence do not depend upon a prior sequence of mechanical actions. The apparatus of the present invention is hence more operationally flexible than such previous devices. Further, such an arrangement permits independent operation of each system in the projector, so that they may be operated in any sequence by the operator.

Although a preferred embodiment of the invention has been disclosed herein for purposes of illustration, it should be understood that various changes, modifications and substitutions may be incorporated in such embodiment without departing from the spirit of the invention as defined by the claims which follow.

What is claimed is:

1. In a multiple optics projection slide projector, an apparatus for moving slides stored in a slide receptacle into and out of either of at least two projection optics systems, comprising:
    first and second slide gate means for holding slides, each slide gate means being movable between a first position in which slides are acquired and released, and a second position in which acquired slides are projected onto a screen or the like; and
    first and second means for rotating, respectively, said first and second slide gate means between said first and second positions about axes which are parallel to the plane of the slides in said second position.

2. An apparatus of claim 1, wherein said first position of said first and second slide gate means is a common position.

3. An apparatus of claim 2, wherein said first and second slide gate means are separated from the slide receptacle.

4. An apparatus of claim 3, wherein slides are passed between the slide receptacle and said slide gate means when said slide gate means is in said first position.

5. An apparatus of claim 4, including means for moving a slide from said slide gate means into the slide receptacle.

6. An apparatus of claim 5, including means supporting the slide receptacle relative to said slide gate means such that a slide in the slide receptacle can move by gravity from the slide receptacle into said slide gate means when said slide gate means is in said first position.

7. An apparatus of claim 2, wherein said first position is at a right angle to said second position.

8. An apparatus of claim 7, wherein the slides are fed by gravity from the slide receptacle into said first and second slide gate means when they are in said first position.

9. An apparatus of claim 5, wherein said means for moving a slide from said slide gate means into the slide receptacle includes (1) an elongated arm which is pivoted at one end and has a projection at the other end and (2) means for rotating said arm about said one end, wherein said arm is positioned such that said projection bears against the bottom of a slide in said slide gate means and in operation moves the slide from said slide gate means up in the slide receptacle when said arm is rotated about said one end.

10. An apparatus of claim 9, wherein said rotating means in operation moves said arm sufficiently that a portion of the projection extends up through the opening in the receptacle through which the slides are moved to said slide gate means, and wherein said projection is so shaped that when it is in its uppermost position, the edges of the projection substantially mate with the opening in the receptacle, while the central portion of the projection extends approximately $\frac{1}{8}$ inch above the opening.

11. An apparatus of claim 1, wherein said first and second rotating means each include means biasing their associated said slide gate means into said second position and further each include actuating means operative to move their associated said slide gate means from said second position into said first position against the action of said bias means.

12. An apparatus of claim 1, wherein the axes of rotation of said first and second rotating means are spaced apart from each other but are located such that said first and second slide gate means are similarly oriented wherein they are in their respective first positions.

13. An apparatus of claim 12, wherein each slide gate means comprises an upstanding frame means with a central opening through which a slide image may be projected onto the screen, wherein said frame means further includes means positioned along the two side edges thereof and along a portion of the bottom thereof for supporting the slide in a desired orientation.

14. An apparatus of claim 13, wherein a first portion of said support means in the upstanding frame means, located along one side edge thereof, moves between a closed position and an open position, to permit insertion and removal of the slide in said slide gate means.

15. An apparatus of claim 14, wherein said frame means includes means for biasing said first portion in the closed position, and further includes means for moving said first portion in the open position when said slide gate means is in the first position, so that a slide may be moved into or out of said slide gate means.

16. An apparatus of claim 1, wherein said first and second slide gate means are movable independently of said projection optics systems.

17. An apparatus of claim 1, wherein said first and second positions of each slide gate means are no higher than the slide receptacle.

18. A multiple projection optics slide projector, which is adapted to receive a slide receptacle having a plurality of individual compartments in which slides may be positioned, comprising:
means for supporting the slide receptacle;
first and second projection optics systems for projecting slides onto a screen or the like for viewing;
first and second slide gate means for holding slides, each slide gate means being movable between a first position in which slides are acquired and released, and a second position, which is one of said projection optics systems, in which acquired slides are projected onto the screen;
first and second means for rotating, respectively, said first and second slide gate means between said first and second positions about axes which are parallel to the plane of the slides in said second position;
means for moving a slide from said slide gate means to the slide receptacle when said slide gate means is in said first position; and
means for moving the slide receptacle in such a manner that each compartment in the receptacle may be uniquely addressed,
said first and second slide gate means, said slide moving means, and said slide receptacle moving means being constructed to be independently operable, so that they may be actuated independently in any desired sequence.

19. An apparatus of claim 18, wherein said first position of said first and second slide gate means is a common position.

20. An apparatus of claim 19, including means for moving said first and second projection optics systems toward and away from each other, so as to correct paralax in the projected images formed on the screen or to implement separation of said projected images.

21. An apparatus of claim 20, wherein a portion of said first and second projection optics systems are contained, respectively, in first and second frame means, and wherein said projection optics moving means includes (1) means permitting pivoting movement of said first and second frame means toward and away from each other, and (2) an elongated rod-like element which extends through both first and second frame means, wherein said rod-like element includes along its length first and second oppositely threaded portions which mate with correspondingly threaded receiving means positioned in said first and second frame means so that rotation of said rod-like element in one direction results in a movement of said first and second frame means, and hence the projected images, toward each other while rotation of said rod-like element in the other direction results in movement of said first and second frame means, and hence the projected images, away from each other.

22. An apparatus of claim 21, wherein said movement permitting means include means pivoting said first and second frame means about spaced pivot points.

23. An apparatus of claim 19, wherein said supporting means supports the slide receptacle relative to said slide gate means such that a slide in the slide receptacle can move by gravity from the slide receptacle into said slide gate means when said slide gate means is in said first position.

24. An apparatus of claim 18, wherein said receptacle moving means includes a horizontal gear which is configured to mate with matching lugs on the slide receptacle, and further includes actuating means for rotating said gear a selected amount so that each compartment in the slide receptacle is uniquely addressable.

25. An apparatus of claim 24, wherein said actuating means is a stepping motor.

26. An apparatus of claim 18, wherein said first and second rotating means each include means biasing their associated said slide gate means into said second position and further each include actuating means operative to move their associated said slide gate means from said second position into said first position against the action of said biasing means.

27. An apparatus of claim 18, wherein said means for moving a slide from said slide gate means into the slide receptacle includes (1) an elongated arm which is pivoted at one end and has a projection at the other end, and (2) means for rotating said arm about said one end, wherein said arm is positioned such that said projection bears against the bottom of the slide in said slide gate means and in operation moves the slide from the slide gate means up into the slide receptacle when said arm is rotated about said one end.

* * * * *